United States Patent [19]

Valo

[11] 3,939,885

[45] Feb. 24, 1976

[54] EQUIPMENT FOR TRANSFERRING HEAPED TREE TRUNK ONTO A TRANSPORTER FOR FURTHER PROCESSING

[76] Inventor: Antti Tapani Valo, 08100 Lohja 10, Finland

[22] Filed: June 11, 1975

[21] Appl. No.: 585,901

Related U.S. Application Data

[62] Division of Ser. No. 502,587, Sept. 3, 1974.

[30] Foreign Application Priority Data

Sept. 3, 1973  Finland ............................. 2740/73

[52] U.S. Cl. .......................... 144/2 Z; 144/309 AC
[51] Int. Cl.² ........................................ A01G 23/08
[58] Field of Search ..... 144/2 Z, 3 D, 309 AC, 312, 144/34 R, 34 E

[56] References Cited
UNITED STATES PATENTS 3,329,184   7/1967   Longent .......................... 144/2 Z X
3,443,611   5/1969   Jorgensen ............................ 144/2 Z

FOREIGN PATENTS OR APPLICATIONS 127,105   2/1956   U.S.S.R. .......................... 144/144 R

*Primary Examiner*—Travis S. McGehee
*Assistant Examiner*—W. D. Bray
*Attorney, Agent, or Firm*—Ladas, Parry, Von Gehr, Goldsmith & Deschamps

[57] ABSTRACT

Equipment for transferring tree trunks one-by-one from a heap onto a longitudinal transporter comprises a reception table positioned between the heap and said transporter and provided with a feeding device movable back and forth over the table in a direction transversal to the longitudinal direction of the tree trunks in the heap. The feeding device is provided with a gripper for drawing each tree trunk in its longitudinal direction from the heap onto conveyors which are arranged on the table for transporting of the tree trunk in a direction perpendicular to its longitudinal direction onto the longitudinal transporter.

4 Claims, 1 Drawing Figure

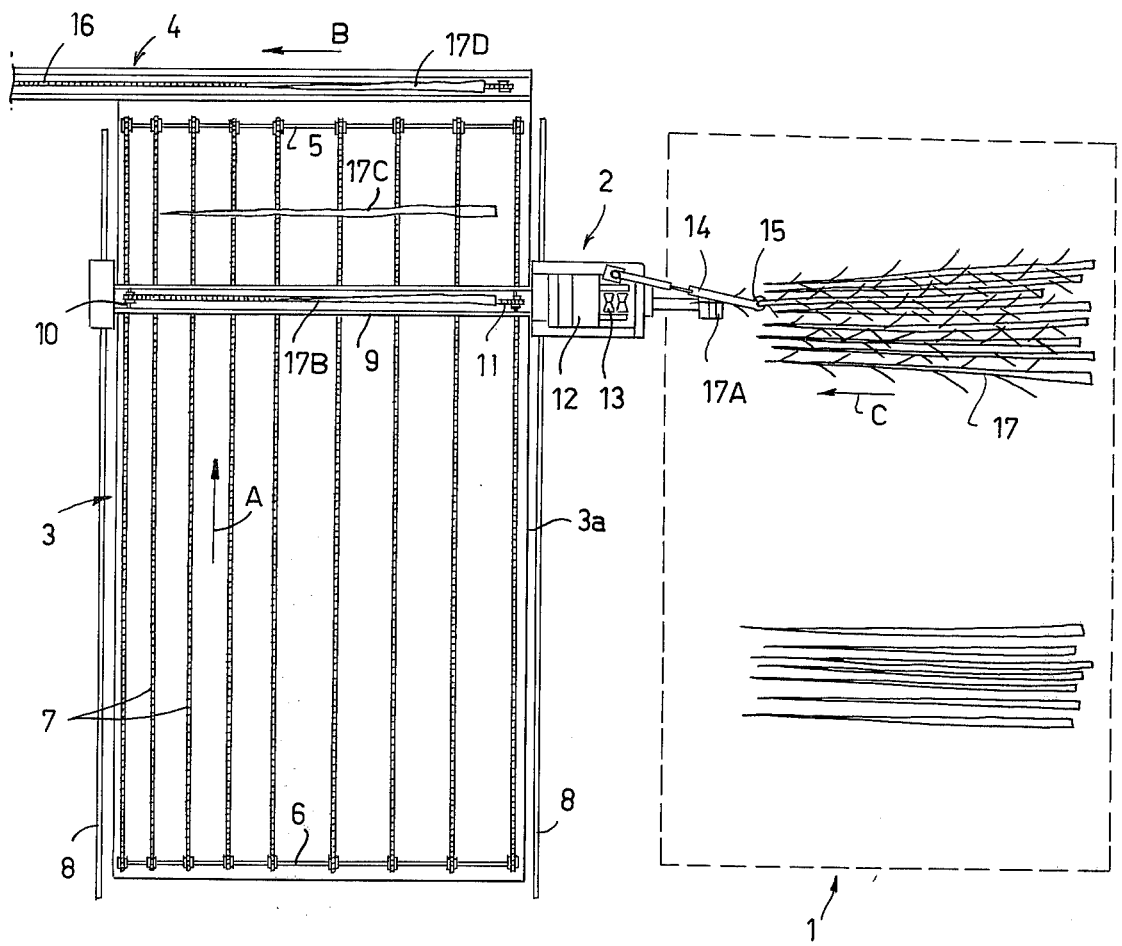

EQUIPMENT FOR TRANSFERRING HEAPED TREE TRUNK ONTO A TRANSPORTER FOR FURTHER PROCESSING

This is a division of application Ser. No. 502,587 filed Sept. 3, 1974.

The subject of the present invention is equipment for one-by-one transferring of tree trunks stored in heaps, onto a longitudinal transporter transporting the trunks to further processing, whereby the equipment comprises a reception table on which a transporter carries the tree trunks transversally from the heaps onto said longitudinal transporter.

It is a previously known method to bring the felled tree trunks to the handling site as heaped into bundles and to take apart the bundles on the reception table so that only one tree trunk at a time is carried from the reception table to the extension transporter. In this case the procedure has usually been such that either entire bundles of trunks have been lifted onto the reception table by means of a portable crane moving across the heaps consisting of tree trunks, or an appropriate number of trunks has been lifted from the heap of trunks by means of a fork-lift truck onto the reception table. Thus, in both cases the bundles of tree trunks have been taken apart on the reception table while the trunks are proceeding on the table towards the extension transporter.

Both of the ways of taking apart described above involve the drawback that the reception table with its transporter and supporting structure must be made very robust and strong, because they must stand loads of entire bundles of tree trunks. Moreover, particular devices are required for taking apart the bundles lifted onto the reception table, by means of which devices it is possible to grasp both the top part and the root part of the tree trunk, because individual trunks must be pulled off the bundle in their transversal direction. In the latter method a particular bundle transfer vehicle is required additionally.

A purpose of the present invention is to provide a feeding equipment that eliminates the above drawbacks, and this is achieved by means of the equipment in accordance with the invention, which is characterized by at least one feeding device that moves above the reception table transversally in relation to the longitudinal direction of the heaped tree trunks and that is provided with a gripping device so as to move the tree trunks one by one substantially in their longitudinal direction onto said reception table.

The feeding equipment in accordance with the present invention is based on the idea that the tree trunks are pulled one by one from the heaps in the longitudinal direction of the trunks and are moved further in their longitudinal direction onto the transversal transporters of the reception table. In such a case the tree trunks are unloaded from vehicles into heaps alongside the reception table at such a place and position that the trunks are directed substantially towards a side of the reception table while one end of the trunks is located next to said side of the reception table. Since a tree trunk can be pulled off the heap considerably easier in the longitudinal direction than in the transversal direction, one simple gripping device is sufficient for the equipment, by which device the end of a trunk in the heap is caught and the trunk pulled off the heap and further onto the reception table. In this way it is completely unnecessary to move the trunks as bundles onto the reception table, whereby the transporters and support constructions of the reception table may be made as of a considerably lighter construction.

When unlopped tree trunks are to be moved from the heap onto an extension transporter, it is possible to provide the feeding equipment with a lopping machine through which the tree trunk taken off the heap passes when it is fed onto the reception table. The feeding equipment in accordance with the invention is thus suitable for feeding of both lopped and unlopped tree trunks.

By making the feeding equipment mobile all over the reception table, taking apart of trunk bundles is permitted at one section of the heap area while the heap area is being refilled at another section. Also, it is possible to use several feeding equipments at the same time, which increases the feeding capacity of the reception table.

The invention will be described in more detail below with reference to the attached drawing, which gives a schematical view of a preferred embodiment of the feeding equipment in accordance with the invention as a top view.

In the drawing the reference numeral 1 denotes the heap area for tree trunks in general, 2 denotes the feeding equipment in accordance with the invention, 3 denotes the reception table, and 4 denotes the extension transporter.

The reception table 3 comprises a horizontal transporter consisting of several parallel transporter chains 7 passing around horizontal drive shafts 5, 6. The direction of movement of the transporter is indicated by arrow A.

At opposite sides of the reception table 3, parallel rails 8 have been provided, along which the feeding equipment 2 moves, consisting of a transversal beam 9 extending perpendicularly across the transporters 7. The transversal beam supports a transporter which consists of a horizontal transporter chain 11 passing around drive shafts 10. The beam additionally supports a lopping machine 12 with feeding rollers 13, mounted at one of its ends, as well as an articulated arm 14 turning around a vertical shaft and provided with a gripping chuck 15.

At the end of the reception table 2 next to the drive shaft 5 there is an extension transporter that consists of a horizontal transporter chain 16 positioned perpendicularly to the transporter chains 7 of the reception table. The direction of movement of the extension transporter is denoted with arrow B.

The feeding equipment operates as follows:

Tree trunks 17 collected from chopping areas are unloaded into heaps on the heap area 1 positioned alongside one side 3a of the reception table so that the londitudinal direction C of the tree trunks is substantially perpendicular to the direction of movement A of the transporter chains 7 of the reception table and that the ends of the trunks are positioned next to said side 3a of the reception table.

The feeding equipment 2 is driven along its rails so that it faces the heap, whereupon one grips the end of trunk 17A by the gripping chuck 15 of the arm and pulls the trunk longitudinally off the heap. By means of the arm, the tree trunk is guided into grip between the feeding rollers 13 and further into the lopping machine 12. When leaving the lopping machine, the tree trunk comes onto the transporter chain 11, which moves the trunk longitudinally above the reception table. Reference numeral 17B denotes such a lopped tree trunk.

After the tree trunk has moved entirely to above the reception table, it is dropped, by a mechanism not shown, onto the transporter chains 7. The transporter chains move the tree trunk transversally towards the extension transporter 4, and reference numeral 17C shows such a tree trunk.

At the end of the reception table, the tree trunk is dropped onto the transporter chain 16 of the extension transporter, which chain moves the trunk longitudinally forwards to the next processing step. Reference numeral 170 denotes such a tree trunk.

From the drawing it is noticed that the tree trunks can be unloaded from the heap one by one by removing them from same longitudinally. Thus, the bundles of trunks need not be lifted onto the reception table from the heap area. While one heap is being emptied, new heaps of trunks can be formed in another section of the area. After one heap has been emptied, the feeding equipment is driven to another heap. When the tree trunk is still in the lopping machine, the arm 14 can already prepare the feeding-in of the next trunk.

The drawing and the related specification are only intended to illustrate the idea of the invention. In its details the feeding equipment in accordance with the invention may vary even considerably within the scope of the patent claims. Thus, it is possible to mount on the rails several independently operating sets of feeding equipment. When ready-lopped trunks are handled, the lopping machine can, of course, be omitted. The transporter 7 may be of a different construction, e.g. consisting of a gliding plane that can be tilted.

What I claim is:

1. Equipment for transferring tree trunks one-by-one from a first region to a second region, the equipment comprising a feeding device for removing the tree trunks from the first region, a receiving table, and a conveyor means on the receiving table for receiving tree trunks which have been removed from the first region by the feeding device and conveying them to the second region, the feeding device comprising:

a gripper for gripping a tree trunk disposed in said first region;

a roller conveyor having its feeding direction transverse to the feeding direction of said conveyor means and positioned to receive the tree trunk from the gripper and advance it longitudinally;

a second conveyor having its feeding direction aligned with the feeding direction of said roller conveyor and arranged to receive the tree trunk from the roller conveyor and advance it longitudinally to discharge it onto said conveyor means; and a lopping machine arranged between the gripper and the second conveyor to lop the tree trunk as it passes from said first region to the second conveyor.

2. Equipment as claimed in claim 1, wherein the feeding device is movable with respect to the receiving table substantially parallel to the feeding direction of the conveyor means.

3. Equipment as claimed in claim 2, comprising rails positioned at opposite sides of the receiving table and extending parallel to the feeding direction of the conveyor means, the feeding device being mounted so as to be movable on said rails.

4. Equipment as claimed in claim 1, wherein the gripper comprises a feeding arm provided with a gripping chuck.

* * * * *